(12) United States Patent
Fu

(10) Patent No.: US 12,477,571 B2
(45) Date of Patent: Nov. 18, 2025

(54) METHOD FOR RESOURCE CONFIGURATION, AND COMMUNICATION DEVICE

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 405 days.

(21) Appl. No.: 18/014,115

(22) PCT Filed: Aug. 13, 2020

(86) PCT No.: PCT/CN2020/108899
§ 371 (c)(1),
(2) Date: Dec. 30, 2022

(87) PCT Pub. No.: WO2022/032571
PCT Pub. Date: Feb. 17, 2022

(65) Prior Publication Data
US 2023/0269767 A1 Aug. 24, 2023

(51) Int. Cl.
*H04W 72/0453* (2023.01)
*H04W 74/00* (2009.01)
*H04W 74/0808* (2024.01)

(52) U.S. Cl.
CPC ..... *H04W 74/006* (2013.01); *H04W 72/0453* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 10,771,986 B2 | 9/2020 | Yang et al. | |
| 2018/0324604 A1 | 11/2018 | Yang et al. | |
| 2019/0281482 A1 | 9/2019 | Yerramalli | |
| 2020/0037354 A1 | 1/2020 | Li et al. | |
| 2020/0280971 A1* | 9/2020 | Moon | H04L 5/0053 |
| 2023/0189334 A1* | 6/2023 | He | H04W 72/56 |
| | | | 370/329 |
| 2023/0319874 A1* | 10/2023 | Myung | H04W 72/0457 |
| | | | 370/329 |

FOREIGN PATENT DOCUMENTS

| | | |
|---|---|---|
| CN | 106454881 A | 2/2017 |
| CN | 106686603 A | 5/2017 |
| CN | 107889114 A | 4/2018 |

(Continued)

OTHER PUBLICATIONS

Yan-hong Jiao, et al., "Discussion on evaluation system of TD-LTE radio network utilization rate," TD-LTE Technical Column, Jan. 2013, (5p).

(Continued)

*Primary Examiner* — Jenkey Van
(74) *Attorney, Agent, or Firm* — Arch & Lake LLP

(57) ABSTRACT

A method for resource configuration, applied to a base station, including: configuring a frame based equipment (FBE) parameter, where the FBE parameter includes: a frequency domain parameter indicating a frequency domain resource for performing clear channel assessment (CCA).

15 Claims, 5 Drawing Sheets

(56) References Cited

FOREIGN PATENT DOCUMENTS

| CN | 110831179 A | 2/2020 | |
|---|---|---|---|
| CN | 110890953 A | 3/2020 | |
| KR | 20160121781 A | 10/2016 | |
| WO | 2018152985 A1 | 8/2018 | |
| WO | 2019105477 A1 | 6/2019 | |
| WO | 2020034437 A1 | 2/2020 | |
| WO | 2020035026 A1 | 2/2020 | |
| WO | WO-2021142795 A1 * | 7/2021 | ............ H04W 24/02 |

OTHER PUBLICATIONS

Xiaoge Huang, et al., Coexistence mechanism of LTE-U and WiFi systems in the unlicensed spectrum, Journal of Chongqing University of Posts and Telecommunications(Natural Science Edition), vol. 29 No. 5, Oct. 2017, (8p).

Nokia, et al., "Remaining details on NR-U uplink signals and channels," 3GPP TSG RAN WG1, Meeting #99, R1-1912259, Reno, USA, Nov. 18-22, 2019, (16p).

Notification to Grant Patent Right for Invention, issued in Application No. 202080001902.0 dated Jan. 19, 2024 with English translation, (7p).

International Search Report of PCT/CN2020/108899 dated May 7, 2021, with English translation, (4p).

* cited by examiner

METHOD FOR RESOURCE CONFIGURATION, AND COMMUNICATION DEVICE

CROSS REFERENCE

The present application is the National Stage of International Application No. PCT/CN2020/108899, filed on Aug. 13, 2020, the entire contents of which are incorporated herein by reference in their entireties for all purposes.

TECHNICAL FIELD

The present disclosure relates to the technical field of wireless communications, but is not limited to the technical field of wireless communications, and in particular, to a method for resource configuration, an apparatus, a communication device, and a storage medium.

BACKGROUND

On the unlicensed spectrum, the data sending end in the wireless communication system needs to monitor the channel before occupying the channel to send data, that is, performing clear channel assessment (CCA). After the data sending end performs CCA, if it is determined that the channel is idle, the channel may be occupied to send data; otherwise, the channel cannot be occupied. The above process is generally referred to as a process of Channel Access of Listen Before Talk (LBT) on an unlicensed band.

In the frequency domain, the data sending end performs CCA by taking an LBT band as a unit. At present, an LBT band is appointed in a communication protocol to be 20 MHz. The spectrum used by the communication between the data sending end and the data receiving end may include one or more LBT bands. CCA monitoring on each LBT band is independent.

SUMMARY

According to a first aspect of the embodiments of the present disclosure, there is provided a method for resource configuration, where the method is applied to a base station, and the method includes: configuring a frame based equipment (FBE) parameter, where the FBE parameter includes: a frequency domain parameter indicating a frequency domain resource for performing clear channel assessment (CCA).

According to a second aspect of the embodiments of the present disclosure, there is provided a method for resource configuration, applied to a user equipment (UE), the method including:
receiving a frame based equipment (FBE) parameter, where the FBE parameter includes: a frequency domain parameter indicating a frequency domain resource for performing clear channel assessment (CCA).

According to a third aspect of the embodiments of the present disclosure, there is provided a communication device, including a processor, a memory, and an executable program stored on the memory and executable by the processor, where the processor executes the steps of the method for resource configuration according to the first aspect or the second aspect when running the executable program.

BRIEF DESCRIPTION OF THE DRAWINGS

The accompanying drawings are incorporated in and constitute a part of the description, illustrate embodiments consistent with the present disclosure, and serve to explain the principles of the embodiments of the present disclosure together with the description.

DETAILED DESCRIPTION embodiments will be described in detail here, examples of which are illustrated in the accompanying drawings. The following description refers to the accompanying drawings in which the same numbers in different drawings represent the same or similar elements unless otherwise represented. The implementations described in the following embodiments do not represent all implementations consistent with the embodiments of the present disclosure. Rather, they are examples of apparatuses and methods consistent with some aspects of the embodiments of the present disclosure as detailed in the appended claims.

The term used in the embodiments of the present disclosure is for the purpose of describing particular embodiments only and is not intended to limit the embodiments of the present disclosure. As used in the embodiments of the present disclosure and the appended claims, the singular forms "a", "the" and "the" are also intended to include most forms unless the context clearly indicates other meanings. It should also be understood that the term "and/or" as used here refers to and includes any or all possible combinations of one or more associated listed items.

It should be understood that although the terms first, second, third, etc. may be used in the embodiments of the present disclosure to describe various information, the information should not be limited to these terms. These terms are only used to distinguish the same type of information from each other. For example, without departing from the scope of the embodiments of the present disclosure, the first information may also be referred to as second information, and similarly, the second information may also be referred to as first information. Depending on the context, the word "if" as used here may be interpreted as "on the time" or "when" or "in response to determining".

Figure 1:
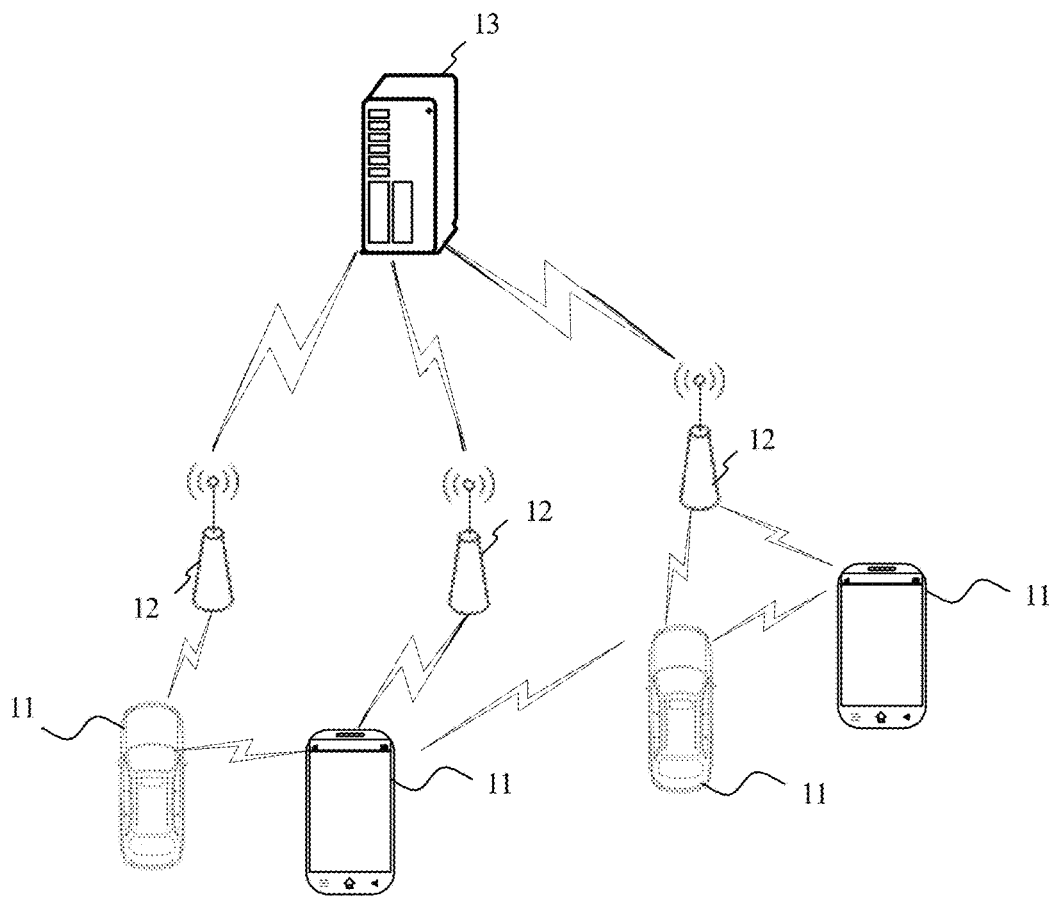
FIG. 1 is a schematic structural diagram of a wireless communication system according to an embodiment.

FIG. 1 is a schematic structural diagram of a wireless communication system according to an embodiment of the present disclosure. As shown in FIG. 1, the wireless communication system is a communication system based on a cellular mobile communication technology, and the wireless communication system may include a plurality of terminals 11 and a plurality of base stations 12

The terminal 11 may be a device that points to a user to provide voice and/or data connectivity. The terminal 11 may communicate with one or more core networks via a radio access network (RAN), and the terminal 11 may be an Internet of Things terminal, such as a sensor device, a mobile phone (or referred to as a "cellular" phone) and a computer having an Internet of Things terminal, for example, may be a fixed, portable, pocket, handheld, computer built-in or vehicle-mounted device, for example, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be a vehicle-mounted device, for example, may be a driving computer having a wireless communication function, or a wireless communication device externally connected to a driving computer. Alternatively, the terminal 11 may also be a roadside device, for example, may be a street lamp having a wireless communication function, a signal light or another roadside device, etc.

The base station 12 may be a network-side device in a wireless communication system. The wireless communication system may be a 4th generation mobile communication (4G) system, also referred to as a long term evolution (LTE) system; or, the wireless communication system may be a 5G system, also referred to as a new radio (NR) system or a 5G NR system. Alternatively, the wireless communication system may be a next generation system of the 5G system. Among them the access network in the 5G system may be referred to as an NG-RAN (New Generation-Radio Access Network). Alternatively, the wireless communication system may be the MTC system.

Among them, the base station 12 may be an evolved Node B (eNB) used in a 4G system. Alternatively, the base station 12 may also be a base station adopting a centralized distributed architecture (gNB) in the 5G system. When the base station 12 adopts a centralized distributed architecture, the base station 12 generally includes a centralized unit (CU) and at least two distributed units (DU). A protocol stack of a Packet Data Convergence Protocol (PDCP) layer, a Radio Link Control Protocol (RLC) layer, and a Media Access Control (MAC) layer is provided in the centralized unit; a Physical (PHY) layer protocol stack is provided in the distributed unit, and the specific implementation manner of the base station 12 is not limited A wireless connection may be established between the base station 12 and the terminal 11 through the wireless air interface. In different embodiments, the wireless air interface is a wireless air interface based on a 4th generation mobile communication network technology (4G) standard; or the wireless air interface is a wireless air interface based on a 5th generation mobile communication network technology (5G) standard, for example, the wireless air interface is a new air interface; or, the wireless air interface may also be a wireless air interface based on a next generation mobile communication network technology standard of 5G.

In some embodiments, an E2E (end to end) connection may also be established between the terminals 11, such as scenarios of V2V (Vehicle to Vehicle) communication, V2I (Vehicle to Infrastructure) communication and V2P (Vehicle to Pedestrian) communication in vehicle to everything (V2X) communication.

In some embodiments, the wireless communication system may further include a network management device 13.

The plurality of base stations 12 are respectively connected to the network management device 13. Among them, the network management device 13 may be a core network device in a wireless communication system, for example, the network management device 13 may be a mobility management entity (MME) in an evolved packet core (EPC)). Alternatively, the network management device may be another core network device, such as a serving gateway (SGW), a public data network gateway (PGW), a policy and charging rules function (PCRF), or a home subscriber server (HSS), etc. For the implementation form of the network management device 13, the embodiments of the present disclosure do not limit.

The execution subject involved in the embodiments of the present disclosure includes, but is not limited to, a UE such as a mobile phone terminal supporting cellular mobile communication, and a base station, etc.

Figure 2:
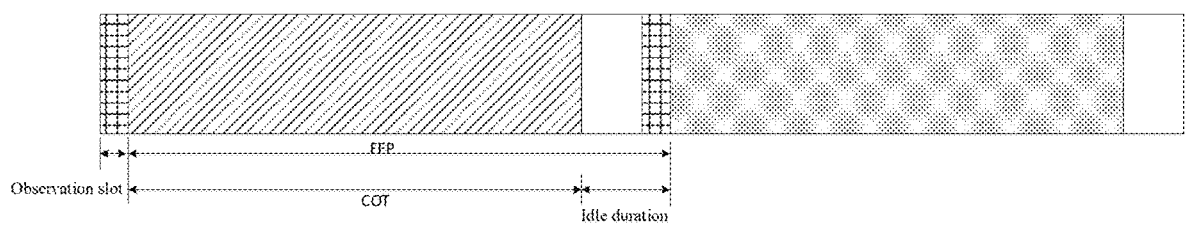
FIG. 2 is a schematic diagram of FFP timing according to an embodiment.

One application scenario of the embodiments of the present disclosure is that, a frame based equipment (FBE) may be a terminal executing a specific channel access manner. In this manner, the data sending end performs channel monitoring with a fixed frame period (FFP). Before the data transmission is started, the data sending end only needs to perform CCA on an observation slot, and can start to transmit data after determining that the channel is idle. As shown in FIG. 2, each FFP may include an idle duration of a fixed duration at the tail, and other parts in the FFP, except for the idle period and the observation slot of the CCA, are the maximum allowed channel occupied time (COT) of the data sending end in one continuous transmission.

In communication of UE initiating channel occupancy as FBE, the uplink channel of the UE still needs to be pre-configured or dynamically scheduled by the base station, so as to ensure that the base station can predict the resource position, modulation mode, etc. used by the uplink transmission to accurately receive the uplink information. Within the COT, the terminal may use the resource uplink data such as a configured grant-physical uplink shared channel (CG-PUSCH), a dynamic scheduling (DS) PUSCH, and a physical uplink control channel (PUCCH) etc.

When configuring the FBE parameter, the base station may configure the FFP period parameter, the idle period and other time domain parameters.

Figure 3:
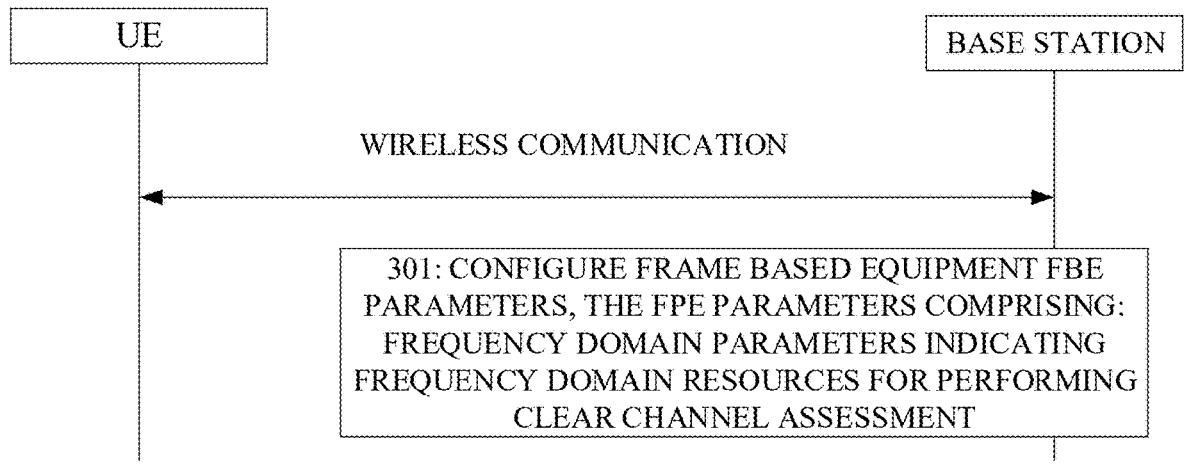
FIG. 3 is a schematic flowchart of a method for resource configuration according to an embodiment.

As shown in FIG. 3, the present embodiment provides a method for resource configuration, which may be applied to a base station of a cellular mobile communication system, and includes that:

In step 301, a frame based equipment (FBE) parameter is configured, where the FBE parameter includes: a frequency domain parameter indicating a frequency domain resource for performing clear channel assessment (CCA).

The base station may include, but is not limited to, a base station in a cellular mobile communication system, and the base station may include, but is not limited to, a UE in a cellular mobile communication system.

The base station and the UE may perform wireless communication through authorized cellular mobile communication spectrum resources, or may perform wireless communication through unlicensed spectrum resources. The cellular mobile communication system may share unlicensed spectrum resources with a Wi-Fi system or the like.

In the related art, in the FBE communication performed between the base station and the UE, the base station may configure the FBE parameter. As shown in FIG. 2, the base station may configure time domain parameters such as FFP period parameters and idle periods. On the other hand, the base station may carry frequency domain resources available for use in broadcast information such as a system message. The base station schedules uplink frequency domain resources and downlink frequency domain resources in a time division multiplexing manner. The use efficiency of the frequency domain resources is low.

Here, the base station may configure the frequency domain parameter in the FBE parameter at the same time when configuring the FBE parameter. The frequency domain parameter may be a frequency domain resource used to indicate performing CCA. Here, the frequency domain resource may be a spectrum range for performing CCA, etc. The frequency domain parameters may indicate frequency domain resources for performing CCA by the base station, and/or spectrum resources for performing CCA by each UE. The base station may configure a frequency domain parameter for the UE through UE-dedicated signaling.

For example, the base station may configure the LBT band for the UE through UE-dedicated signaling. Here, the base station may configure at least one LBT band resource for the UE in the FBE parameter.

Configuring a frequency domain parameter by a base station may provide a basis for implementing frequency division multiplexing (FDD) in communication between different UEs and a base station. Uplink transmissions between different UEs may be performed simultaneously on different frequency domain resources. The uplink transmission of the UE and the downlink transmission of the base station may simultaneously communicate on different frequency domain resources.

For example, in the case that the communication frequency of the base station and the UE includes four LBT bands (1-4), the frequency domain parameter for UE initiating channel occupancy as FBE that the base station can configure for UE1 is LBT band 1, and the frequency domain parameter for UE initiating channel occupancy as FBE that the base station can configure for UE2 is LBT band 2. The frequency domain parameter for base station initiating channel occupancy as FBE that the base station configures for itself is LBT band 3/4. Through such a configuration, LBT band 1/2 is used for uplink transmission, and LBT band 3/4 is used for downlink transmission. Since the uplink transmission and downlink transmission use completely different frequency bands, it is possible to transmit while uplink and downlink do not interfere with each other, thus reducing the time delay of data transmission and realizing FDD on an unlicensed spectrum.

In this way, the frequency domain resource of the CCA may be configured by configuring the FBE parameter containing the frequency domain parameter, for example, the frequency domain parameters configured for the base station and the UE may allocate different frequency domain resources to different transmissions, thus reducing the conflict of the frequency domain resources for performing CCA, and further improving the efficiency of data transmission.

In some embodiments, the FBE parameter includes at least one of the following:
- a first FBE parameter, where the first FBE parameter includes: an uplink frequency domain parameter indicating an uplink frequency domain resource for performing CCA; or
- a second FBE parameter, where the second FBE parameter includes: a downlink frequency domain parameter indicating a downlink frequency domain resource for performing CCA.

For downlink data, that is base station initiates channel occupancy as FBE, the base station uses downlink frequency domain resources for transmission. CCA may be performed by the base station.

For uplink data, that is UE initiates channel occupancy as FBE, and the UE uses uplink frequency domain resources for transmission. CCA may be performed by the UE.

The base station may configure FBE parameters for uplink transmission and downlink transmission, respectively.

Here, the FBE parameter for the uplink transmission may include the uplink frequency domain parameter indicating the uplink frequency domain resource. The UE may determine a frequency domain resource for performing CCA in the FFP when the UE performs uplink transmission in the FBE communication according to the uplink frequency domain parameter.

The FBE parameter for a downlink transmission may include a downlink frequency domain parameter indicating a downlink frequency domain resource. The base station may determine a frequency domain resource for performing CCA in the FFP when the base station performs downlink transmission in the FBE communication according to the downlink frequency domain parameter.

In some embodiments, when the FBE parameter is sent to more than one UE, the frequency domain parameter included in the FBE parameter indicates different frequency domain resources for different UEs.

The base station may configure different frequency domain resources to different UEs. Here, the frequency domain resource includes an uplink frequency domain resource and a downlink frequency domain resource. In this way, different UEs may transmit at the same time by using their own frequency domain resources, thus achieving FDD, improving frequency resource usage efficiency, and reducing transmission delay.

In some embodiments, the uplink frequency domain resource indicated by the uplink frequency domain parameter is different from the downlink frequency domain resource indicated by the downlink frequency domain parameter.

The base station may respectively configure the downlink transmission and the uplink transmission onto different frequency domain resources, thus avoiding conflicts between uplink transmission and downlink transmission, and realizing simultaneous transmission of uplink and downlink. The use efficiency of the frequency resources is improved, and the transmission delay is reduced.

Figure 4:
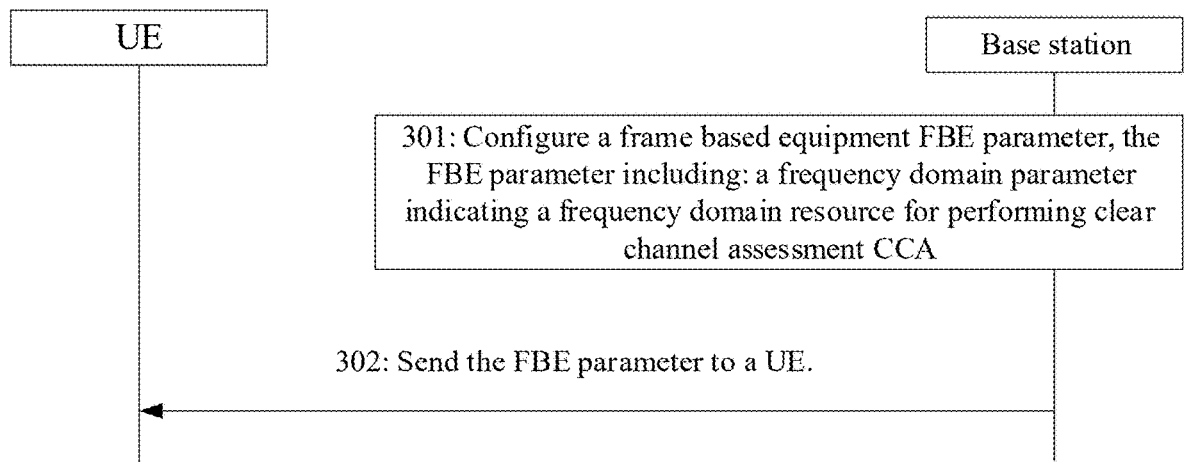
FIG. 4 is a schematic flowchart of another method for resource configuration according to an embodiment.

In some embodiments, as shown in FIG. 4, the method further includes:

In step 302, the FBE parameter is sent to the UE.

The base station may send the configured FBE parameter to the UE. The UE may determine a downlink frequency domain resource and/or an uplink frequency domain resource according to the issued FBE parameter.

The UE may perform CCA on the uplink frequency domain resource indicated by the uplink frequency domain parameter, and determine the occupancy situation of the uplink frequency domain resource.

In some embodiments, the UE may also perform CCA on the downlink frequency domain resource indicated by the downlink frequency domain parameter, and assist the base station in monitoring downlink frequency domain resources.

In some embodiments, the sending the FBE parameter to the UE includes one of the following:
- sending RRC signaling carrying the FBE parameter to the UE;
- broadcasting broadcast information carrying the FBE parameter to the UE.

The base station may also carry the FBE parameter through dedicated signaling, such as RRC signaling. The base station needs to send the RRC signaling carrying the FBE parameter containing the downlink frequency domain parameter to each UE, respectively. After obtaining the FBE parameter including the downlink frequency domain parameter, the terminal may monitor the downlink transmission on the corresponding downlink frequency domain.

The base station may also carry the FBE parameter through dedicated signaling, such as RRC signaling. The uplink frequency domain parameter included in the FBE parameter sent by the RRC signaling may indicate a frequency domain resource configured to the receiving end UE of the RRC signaling for performing CCA.

The base station may also broadcast the FBE parameter including an uplink frequency domain parameter to each UE through a broadcast system message, and the broadcasted FBE parameter may include uplink frequency domain parameters of one or more UEs. The uplink frequency domain parameters of different UEs may be identified by using the identification information of the UEs, respectively, so that the UE may determine respective uplink frequency domain parameters according to the identification information.

The base station may carry the uplink frequency domain parameter and the downlink frequency domain parameter in broadcast information such as a system message, and indicate a frequency domain resource available for downlink transmission and a frequency domain resource available for uplink transmission. The base station performs CCA and downlink transmission in the frequency domain resource configured by the base station for downlink transmission, and the terminal performs CCA and uplink transmission in the frequency domain resource configured by the base station for uplink transmission. The base station may respectively configure the downlink transmission and the uplink transmission onto different frequency domain resources, thus avoiding conflicts between uplink transmission and downlink transmission, and realizing simultaneous transmission of uplink and downlink.

In some embodiments, the sending the RRC signaling carrying the FBE parameter to the UE includes:

sending the RRC signaling carrying the FBE parameter associated with the UE to the UE.

The base station may send the uplink frequency domain parameter and the downlink frequency domain parameter associated with the UE to the UE through RRC signaling.

The base station may send the downlink frequency domain parameter to the UE through the RRC signaling, and the UE may determine the downlink frequency domain resource of the base station. In some embodiments, the UE may perform the auxiliary CCA, that is, the data receiving end assists in monitoring the monitoring of the downlink frequency domain resource.

With the uplink frequency domain parameter carried by the RRC signaling, the uplink frequency domain parameter may be sent to the UE through the UE dedicated signaling, so that the base station may configure different uplink frequency domain resources for different UEs. The UE may determine the uplink frequency domain resource for itself and perform CCA.

In some embodiments, the frequency domain resource includes at least one of the following:

at least one Listen Before Talk (LBT) band resource; or at least one resource block (RB).

Communication between a base station and a UE occupies a frequency domain resource by taking an LBT band as a unit. Communication between the base station and one UE may occupy one or more LBT band. The frequency domain resource indicated by the frequency domain parameter may refer to an LBT band resource.

For example, in the case that the communication frequency of the base station and the UE includes four LBT bands (1-4), the frequency domain parameter for UE initiating channel occupancy as FBE that the base station can configure for UE1 is LBT band 1, and the frequency domain parameter for base station initiating channel occupancy as FBE that the base station configures for itself is LBT band 3/4.

The LBT band resource may be composed of an RB. The frequency domain parameter may indicate an RB, such as indicating a number of RBs. The frequency domain band indicated by the frequency domain parameter may be determined according to the number of RBs, the subcarrier number and the subcarrier width of each RB.

Figure 5:
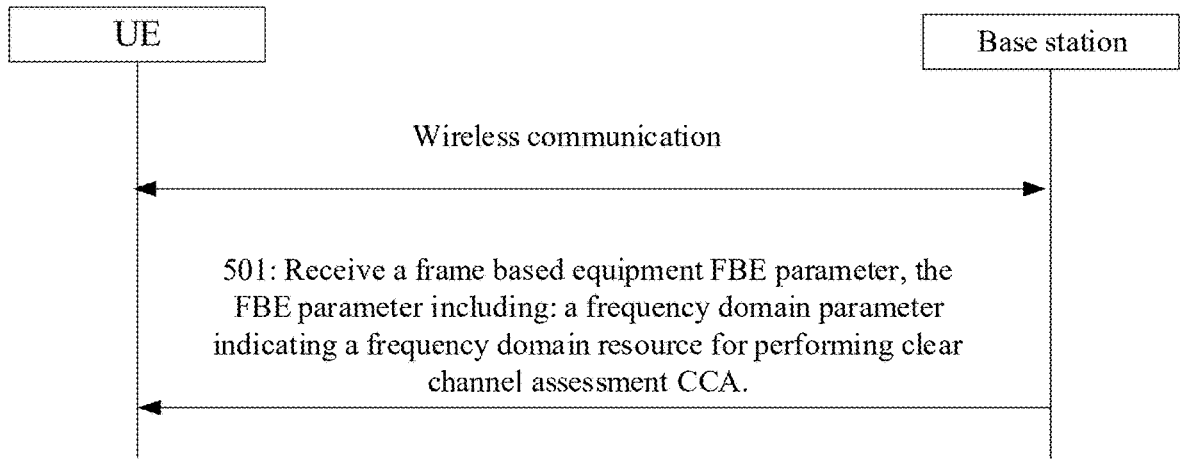
FIG. 5 is a schematic flowchart of another method for resource configuration according to an embodiment.

As shown in FIG. 5, the present embodiment provides a method for resource configuration, which may be applied to a UE of a cellular mobile communication system, and includes:

In step 501, a frame based equipment (FBE) parameter is received, where the FBE parameter includes: a frequency domain parameter indicating a frequency domain resource for performing clear channel assessment (CCA).

The base station may include, but is not limited to, a base station in a cellular mobile communication system, and the UE may include, but is not limited to, a UE in a cellular mobile communication system.

The base station and the UE may perform wireless communication through authorized cellular mobile communication spectrum resources, or may perform wireless communication through unlicensed spectrum resources. The cellular mobile communication system may share unlicensed spectrum resources with a Wi-Fi system or the like.

In the related art, in the FBE communication performed by the base station and the UE, the base station may configure the FBE parameter. As shown in FIG. 2, the base station may configure time domain parameters such as FFP period parameters and idle periods. On the other hand, the base station may carry frequency domain resources available for use in broadcast information such as a system message. The base station schedules uplink frequency domain resources and downlink frequency domain resources in a time division multiplexing manner. The frequency domain resource usage efficiency is low.

Here, the base station may configure the frequency domain parameter in the FBE parameter at the same time when configuring the FBE parameter. The frequency domain parameter may be a frequency domain resource used to indicate performing CCA. Here, the frequency domain resource may be a spectrum range for performing CCA, etc. The frequency domain parameters may indicate the frequency domain resources for the base station to perform CCA, and/or the spectrum resources for each UE to perform CCA. The base station may configure a frequency domain parameter for the UE through UE-dedicated signaling.

For example, the base station may configure a frequency domain parameter for the UE through UE-dedicated signaling. Here, the base station may configure at least one LBT band resource for the UE in the FBE parameter.

Configuring a frequency domain parameter by a base station may provide a basis for implementing frequency division multiplexing (FDD) in the communications between different UEs and a base station. Uplink transmissions between different UEs may be performed simultaneously on different frequency domain resources. The uplink transmission between the uplink transmission of the UE and the base station may simultaneously communicate on different frequency domain resources.

For example, in the case that the communication frequency of the base station and the UE includes four LBT bands (1-4), the frequency domain parameter for UE initiating channel occupancy as FBE that the base station can configure for UE1 is LBT band 1, and the frequency domain parameter for UE initiating channel occupancy as FBE for FBE that the base station can configure for UE2 is LBT band 2. The frequency domain parameter for base station initiating channel occupancy as FBE that the base station configures for itself is LBT band 3/4. Through such a configuration, LBT band 1/2 is used for uplink transmission, and LBT band 3/4 is used for downlink transmission. Since the uplink transmission and downlink transmission use completely different frequency bands, it is possible to transmit while uplink and downlink do not interfere with each other, thus reducing the time delay of data transmission and realizing FDD on an unlicensed spectrum.

The base station may send the configured FBE parameter to the UE. The UE may determine a downlink frequency domain resource and/or an uplink frequency domain resource according to the issued FBE parameter.

The UE may perform CCA on the uplink frequency domain resource indicated by the uplink frequency domain parameter, and determine the occupancy situation of the uplink frequency domain resource.

In some embodiments, the UE may also perform CCA on the downlink frequency domain resource indicated by the downlink frequency domain parameter, and assist the base station in monitoring downlink frequency domain resources.

In this way, by configuring the FBE parameter containing the frequency domain parameter, the frequency domain resource of the CCA may be configured, for example, the frequency domain parameters configured for the base station and the UE may allocate different frequency domain resources to different transmissions, thus reducing the conflict of the frequency domain resources for performing CCA, and further improving the efficiency of data transmission.

In some embodiments, the receiving the FBE parameter includes at least one of the following:
  receiving a first FBE parameter, where the first FBE parameter includes: an uplink frequency domain parameter indicating an uplink frequency domain resource for performing CCA; or
  receive a second FBE parameter, where the second FBE parameter includes a downlink frequency domain parameter indicating a downlink frequency domain resource for performing CCA.

For downlink data, that is base station initiates channel occupancy as FBE, the base station uses downlink frequency domain resources for transmission. CCA may be performed by the base station.

For uplink data, that is UE initiates channel occupancy as FBE, the UE uses uplink frequency domain resources for transmission. CCA may be performed by the UE.

The base station may configure FBE parameters for uplink transmission and downlink transmission, respectively.

Here, the FBE parameter for the uplink transmission may include the uplink frequency domain parameter indicating the uplink frequency domain resource. The UE may determine a frequency domain resource for performing CCA in the FFP when the UE performs uplink transmission in the FBE communication according to the uplink frequency domain parameter.

The FBE parameter for the downlink transmission may include a downlink frequency domain parameter indicating a downlink frequency domain resource. The base station may determine a frequency domain resource for performing CCA in the FFP when the base station performs downlink transmission in the FBE communication according to the downlink frequency domain parameter.

In some embodiments, when the FBE parameter is sent to more than one UE, the frequency domain parameter included in the FBE parameter indicates different frequency domain resources for different UEs.

The base station may configure different frequency domain resources to different UEs. Here, the frequency domain resource includes an uplink frequency domain resource and a downlink frequency domain resource. In this way, different UEs may transmit at the same time using their own frequency domain resources, thus achieving FDD, improving frequency resource usage efficiency, and reducing transmission delay.

In some embodiments, the uplink frequency domain resource indicated by the uplink frequency domain parameter is different from the downlink frequency domain resource indicated by the downlink frequency domain parameter.

The base station may respectively configure the downlink transmission and the uplink transmission onto different frequency domain resources, thus avoiding conflicts between uplink transmission and downlink transmission, and realizing simultaneous transmission of uplink and downlink. The use efficiency of the frequency resources is improved, and the transmission delay is reduced.

Figure 6:
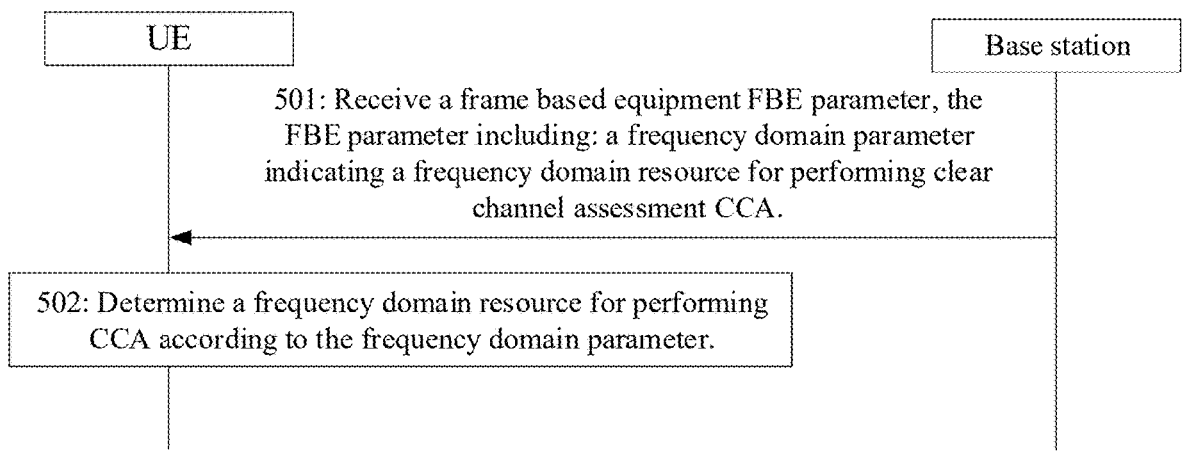
FIG. 6 is a schematic flowchart of another method for resource configuration according to an embodiment.

In some embodiments, as shown in FIG. 6, the method further includes:

In step 502, a frequency domain resource for performing CCA is determined according to the frequency domain parameter.

After receiving the FBE parameter, the UE may determine that the frequency domain resources for data downlink performed by the base station, and/or the frequency domain resource for data uplink configured to the UE by the base station.

In some embodiments, the receiving FBE parameter includes one of the following:
  receiving RRC signaling carrying the FBE parameter;
  receiving broadcast information carrying the FBE parameter.

The base station may also carry the FBE parameter through dedicated signaling, such as RRC signaling. The base station needs to send the FBE parameter RRC signaling containing the downlink frequency domain parameter to each UE, respectively. After obtaining the FBE parameter including the downlink frequency domain parameter, the terminal may monitor the downlink transmission on the corresponding downlink frequency domain.

The base station may also carry the FBE parameter through dedicated signaling, such as RRC signaling. The uplink frequency domain parameter included in the FBE parameter sent by the RRC signaling may indicate a frequency domain resource configured to the RRC signaling receiving end UE for performing CCA.

The base station may also broadcast a FBE parameter including an uplink frequency domain parameter to each UE through a broadcast system message, and the broadcasted FBE parameter may include uplink frequency domain parameters of one or more UEs. The uplink frequency domain parameters of different UEs may be identified by using the identification information of the UEs, respectively, so that the UE may determine respective uplink frequency domain parameters according to the identification information.

The base station may carry the uplink frequency domain parameter and the downlink frequency domain parameter in broadcast information such as a system message, and indicate a frequency domain resource available for downlink transmission and a frequency domain resource available for uplink transmission. The base station performs CCA and downlink transmission in the frequency domain resource configured by the base station for downlink transmission, and the terminal performs CCA and uplink transmission in the frequency domain resource configured by the base station for uplink transmission. The base station may respectively configure the downlink transmission and the uplink transmission onto different frequency domain resources, thus avoiding conflicts between uplink transmission and downlink transmission, and realizing simultaneous transmission of uplink and downlink.

In some embodiments, the receiving RRC signaling carrying the FBE parameter includes:

receiving the RRC signaling carrying the FBE parameter associated with the UE.

The base station may send the uplink frequency domain parameter and the downlink frequency domain parameter associated with the UE to the UE through RRC signaling.

The base station may send the downlink frequency domain parameter to the UE through the RRC signaling, and the UE may determine the downlink frequency domain resource of the base station. In some embodiments, the UE may perform the auxiliary CCA, that is, the data receiving end assists in monitoring the monitoring of the downlink frequency domain resource.

With the uplink frequency domain parameter carried by the RRC signaling, the uplink frequency domain parameter may be sent to the UE through the UE dedicated signaling, so that the base station may configure different uplink frequency domain resources for different UEs. The UE may determine the uplink frequency domain resource for itself and perform CCA.

In some embodiments, the frequency domain resource includes at least one of the following:

at least one Listen Before Talk (LBT) band resource; or
at least one resource block (RB).

Communication between a base station and a UE occupies a frequency domain resource by taking an LBT band as a unit. Communication between the base station and one UE may occupy one or more LBT bands. The frequency domain resource indicated by the frequency domain parameter may refer to an LBT band resource.

For example, in the case that the communication frequency of the base station and the UE includes four LBT bands (1-4), the frequency domain parameter for UE initiating channel occupancy as FBE that the base station can configure for UE1 is LBT band 1, the frequency domain parameter for base station initiating channel occupancy as FBE that the base station configures for itself is LBT band 3/4.

The LBT band resource may be composed of an RB. The frequency domain parameter may indicate an RB, such as, indicating the number of RBs. The frequency domain band indicated by the frequency domain parameter may be determined according to the number of RBs, the subcarrier number and the subcarrier width of each RB.

A specific example is provided below in conjunction with any of the above embodiments.

In the related art, when the base station configures the FBE parameter, the FFP period parameter, the idle duration, etc. may be configured, which are both time domain parameters.

In this example, the base station configures the parameter for UE initiating channel occupancy as FBE for the terminal, and in addition to the time domain parameters such as the FFP period parameter/idle period, the frequency domain parameter for performing CCA monitoring by the terminal may be further configured, for example, one or more LBT bands, or a set of more than one RB in the frequency domain. The terminal performs CCA only on one or more configured LBT bands, or a set of more than one RB on the frequency domain, and determines whether to send uplink data according to a CCA result.

When the base station configures the FBE parameters of the present base station, it may also include frequency domain parameters such as one or more LBT bands, or a set of more than one RB on the frequency domain. The base station performs CCA only on one or more configured LBT bands or a set of more than one RB on the frequency domain, and determines whether to send downlink data according to a CCA result.

The advantage of configuring the frequency domain parameter in the FBE parameter is that the FDD data transmission mode can be realized, so that uplink and downlink data can be transmitted simultaneously, and compared with a TDD mode in a common unlicensed frequency band, the time delay of data transmission is reduced.

For example, in the case that the communication frequency of the base station and the UE includes four LBT bands (1-4), the frequency domain parameter for UE initiating channel occupancy as FBE that the base station can configure for UE1 is LBT band 1, and the frequency domain parameter for UE initiating channel occupancy as FBE t that the base station can configure for UE2 is LBT band 2. The frequency domain parameter for base station initiating channel occupancy as FBE that the base station configures for itself is LBT band 3/4. Through such a configuration, LBT band 1/2 is used for uplink transmission, and LBT band 3/4 is used for downlink transmission. Since the uplink transmission and downlink transmission use completely different frequency bands, it is possible to transmit while uplink and downlink do not interfere with each other, thus reducing the time delay of data transmission and realizing FDD on an unlicensed spectrum.

Figure 7:
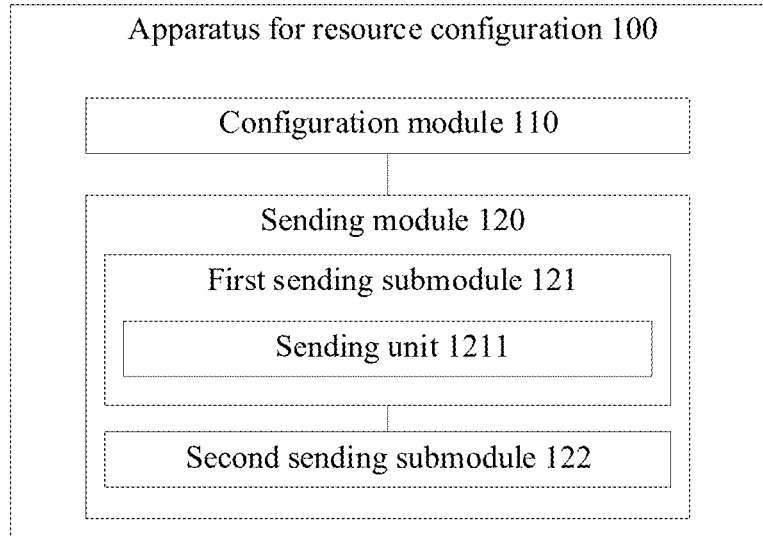
FIG. 7 is a block diagram of an apparatus for resource configuration according to an embodiment.

An embodiment of the present disclosure further provides an apparatus for resource configuration, which is applied to a data frame sending end of wireless communication, as shown in FIG. 7, the apparatus 100 for resource configuration includes: a configuration module 110, where, the configuration module 110 is configured to configure a frame based equipment (FBE) parameter, and the FBE parameter includes a frequency domain parameter indicating a frequency domain resource for performing clear channel assessment (CCA).

In some embodiments, the FBE parameter includes at least one of the following:

a first FBE parameter, where the first FBE parameter includes: an uplink frequency domain parameter indicating an uplink frequency domain resource for performing CCA; or a second FBE parameter, where the second FBE parameter includes: a downlink frequency domain parameter indicating a downlink frequency domain resource for performing CCA.

In some embodiments, the uplink frequency domain resource indicated by the uplink frequency domain parameter is different from the downlink frequency domain resource indicated by the downlink frequency domain parameter.

In some embodiments, the apparatus 100 further includes:
a sending module 120, configured to send the FBE parameter to the UE.

In some embodiments, the sending module 120 includes one of the following:
a first sending submodule 121, configured to send RRC signaling carrying the FBE parameter to the UE;
a second sending submodule 122, configured to broadcast the broadcast information carrying the FBE parameter to the UE.

In some embodiments, the first sending submodule 121 includes:
a sending unit 1211, configured to send the RRC signaling carrying the FBE parameter associated with the UE to the UE.

In some embodiments, the frequency domain resource includes at least one of the following:
at least one Listen Before Talk (LBT) band resource; or
at least one resource block (RB).

In some embodiments, when the FBE parameter is sent to more than one UE, the frequency domain parameter included in the FBE parameter indicates different frequency domain resources for different UEs.

Figure 8:
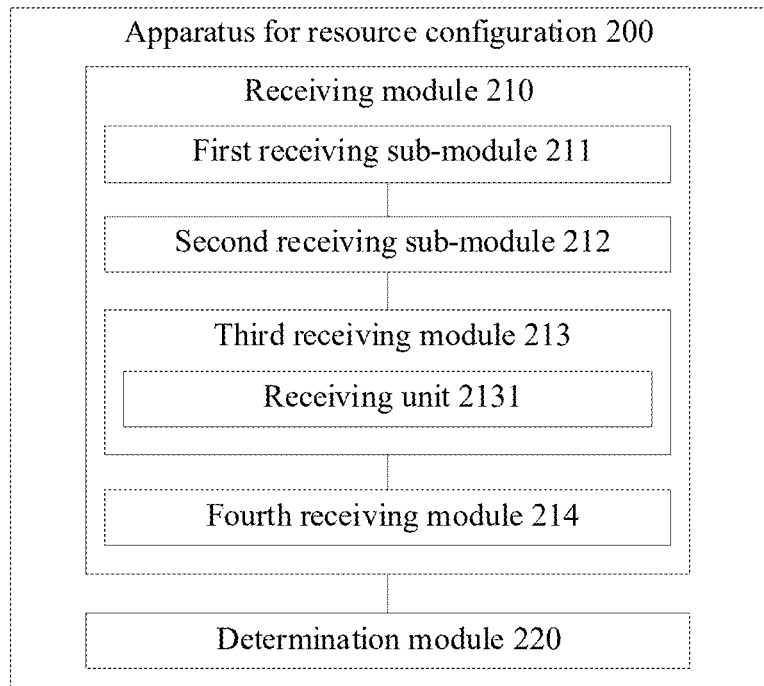
FIG. 8 is a block diagram of another apparatus for resource configuration according to an embodiment.

According to a fourth aspect of the embodiments of the present disclosure, there is provided an apparatus for resource configuration, applied to a user equipment (UE), as shown in FIG. 8, the apparatus includes: a receiving module 210, where, The receiving module 210 is configured to receive a frame based equipment (FBE) parameter, where the FBE parameter includes a frequency domain parameter indicating a frequency domain resource for performing clear channel assessment (CCA).

In some embodiments, the receiving module 210 includes at least one of the following:
a first receiving submodule 211, configured to receive a first FBE parameter, where the first FBE parameter includes: an uplink frequency domain parameter indicating an uplink frequency domain resource for performing CCA; or
a second receiving submodule 212, configured to receive a second FBE parameter, where the second FBE parameter includes a downlink frequency domain parameter indicating a downlink frequency domain resource for performing CCA.

In some embodiments, the uplink frequency domain resource indicated by the uplink frequency domain parameter is different from the downlink frequency domain resource indicated by the downlink frequency domain parameter.

In some embodiments, the apparatus 200 further includes:
a determination module 220, configured to determine a frequency domain resource for performing CCA according to the frequency domain parameter.

In some embodiments, the receiving module 210 includes one of the following:
a third receiving module 213, configured to receive RRC signaling carrying the FBE parameter;
a fourth receiving module 214, configured to receive broadcast information carrying the FBE parameter.

In some embodiments, the third receiving module 213 includes:

a receiving unit 2131, configured to receive RRC signaling carrying the FBE parameter associated with the UE.

In some embodiments, the frequency domain resource includes at least one of the following:
at least one Listen Before Talk (LBT) band resource; or
at least one resource block (RB).

In some embodiment, the configuration module 110, the sending module 120, the receiving module 210, the determination module 220, and the like may be implemented by one or more central processing units (CPU), a graphics processor (GPU), a baseband processor (BP), an Application Specific Integrated Circuit (ASIC), a DSP, a programmable logic device (PLD), a complex programmable logic device (CPLD), a field programmable gate array (FPGA), a general-purpose processor, a controller, a micro controller unit (MCU), a microprocessor, or other electronic components, for executing the foregoing method.

Figure 9:
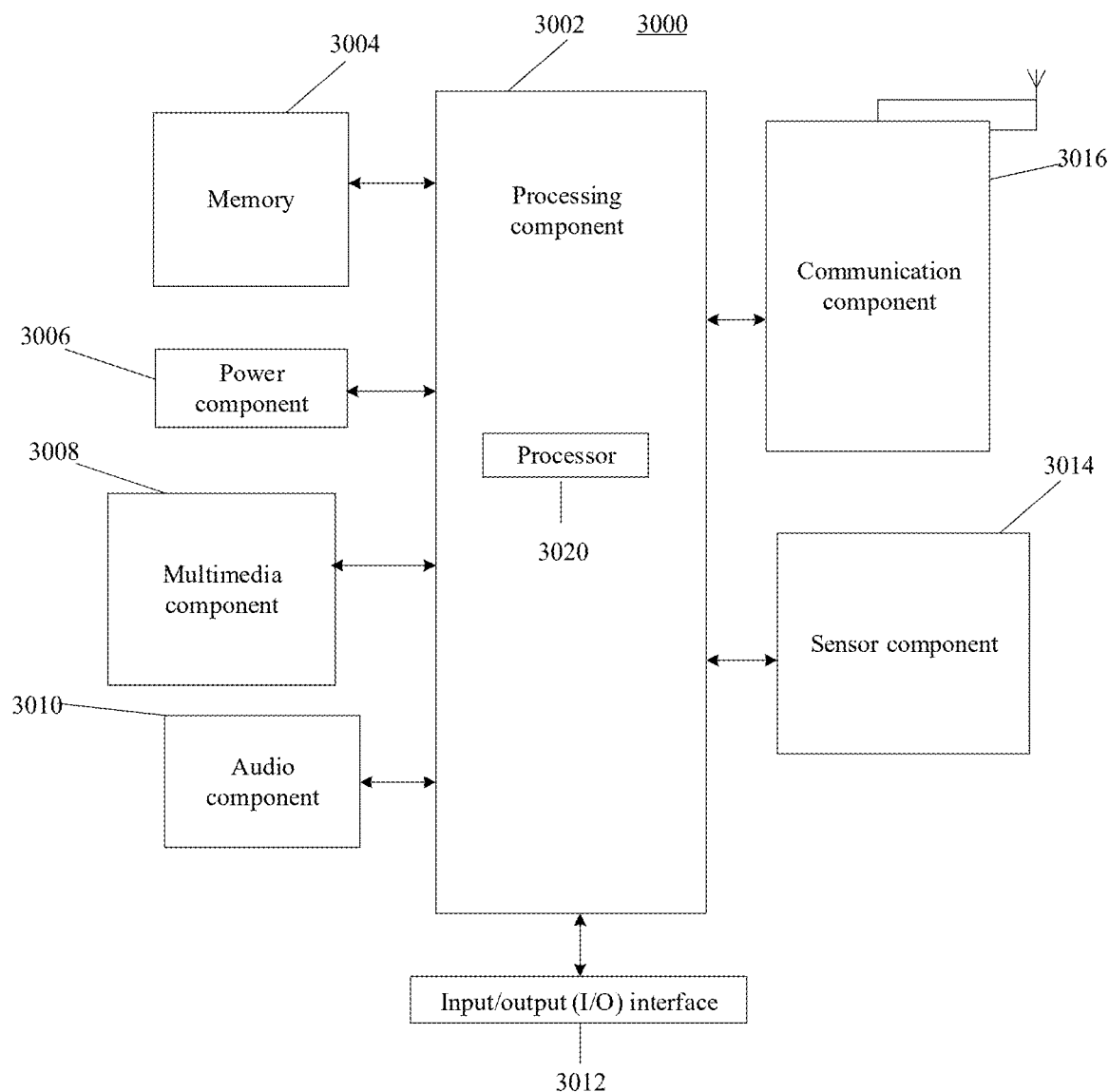
FIG. 9 is a block diagram of a device for resource configuration according to an embodiment.

FIG. 9 is a block diagram of a device 3000 for resource configuration, according to an embodiment. For example, device 3000 may be a mobile phone, a computer, a digital broadcast terminal, a messaging device, a game console, a tablet device, a medical device, an exercise device, a personal digital assistant, etc.

Referring to FIG. 9, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 generally controls the overall operation of the device 3000, such as operations associated with display, telephone calls, data communications, camera operations, and recording operations. The processing component 3002 may include one or more processors 3020 to execute instructions to complete all or some of the steps of the foregoing method. In addition, the processing component 3002 may include one or more modules to facilitate interaction between the processing component 3002 and other components. For example, the processing component 3002 may include a multimedia module to facilitate interaction between the multimedia component 3008 and the processing component 3002.

The memory 3004 is configured to store various types of data to support operation at the device 3000. Examples of such data include instructions for any application or method operating on device 3000, contact data, phonebook data, messages, pictures, videos, and the like. The memory 3004 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 3006 provides electrical power to various components of the apparatus 3000. Power component 3006 may include a power management system, one or more power sources, and other components associated with generating, managing, and distributing power for device 3000.

The multimedia component 3008 includes a screen providing an output interface between the device 3000 and the user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, sliding, and gestures on the touch panel. The touch sensor may not only sense the boundary of the touch or swipe action, but also detect the duration and pressure associated with the touch or swipe action. In some embodiments, the multimedia component 3008 includes a front-facing camera and/or a rear-facing camera. When the device 3000 is in an operation mode, such as a photographing mode or a video mode, the front-facing camera and/or the rear-facing camera may receive external multimedia data. Each front camera and the rear camera may be a fixed optical lens system or have a focal length and an optical zoom capability.

The audio component 3010 is configured to output and/or input an audio signal. For example, the audio component 3010 includes a microphone (MIC) configured to receive an external audio signal when the device 3000 is in an operating mode, such as a call mode, a recording mode, and a speech recognition mode. The received audio signal may be further stored in the memory 3004 or transmitted via the communication component 3016. In some embodiments, the audio component 3010 further includes a speaker configured to output an audio signal.

The I/O interface 3012 provides an interface between the processing component 3002 and the peripheral interface module, and the peripheral interface module may be a keyboard, a click wheel, a button, or the like. The buttons may include, but are not limited to, a home button, a volume button, a start button, and a lock button.

The sensor component 3014 includes one or more sensors for providing status assessments of various aspects for the device 3000. For example, the sensor component 3014 may detect the open/closed state of the device 3000, the relative positioning of the assembly, such as the display of the device 3000 and the keypad, the sensor component 3014 may also detect changes in the position of the device 3000 or a component of the device 300, the presence or absence of user contact with the device 3000, the device 3000 orientation or acceleration/deceleration, and the temperature change of the device 3000. The sensor component 3014 may include a proximity sensor configured to detect the presence of nearby objects without any physical contact. The sensor component 3014 may also include a light sensor, such as a CMOS or CCD image sensor, for use in an imaging application. In some embodiments, the sensor component 3014 may further include an acceleration sensor, a gyroscope sensor, a magnetic sensor, a pressure sensor, or a temperature sensor.

The communication component 3016 is configured to facilitate wired or wireless communication between the apparatus 3000 and other devices. The device 3000 may access a communication standard-based wireless network, such as Wi-Fi, 2G, or 3G, or a combination thereof. In some embodiment, communication component 3016 receives broadcast signals or broadcast related information from an external broadcast management system via a broadcast channel. In some embodiment, the communication component 3016 also includes a near field communication (NFC) module to facilitate short-range communication. For example, the NFC module may be implemented based on a radio frequency identification (RFID) technology, an infrared data association (RRI) technology, an ultra-wideband (UWB) technology, a Bluetooth (BT) technology, and other technologies.

In some embodiment, the device 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the methods described above.

In some embodiment, further provided is a non-transitory computer-readable storage medium including instructions, for example, a memory 3004 including instructions, which may be executed by the processor 3020 of the device 3000 to complete the foregoing method. For example, the non-transitory computer-readable storage medium may be a ROM, a random access memory (RAM), a CD-ROM, a magnetic tape, a floppy disk, an optical data storage device, etc.

In view of this, embodiments of the present disclosure provide a method for resource configuration, an apparatus, a communication device, and a storage medium.

According to a first aspect of the embodiments of the present disclosure, there is provided a method for resource configuration, where the method is applied to a base station, and the method includes: configuring a frame based equipment (FBE) parameter, where the FBE parameter includes: a frequency domain parameter indicating a frequency domain resource for performing clear channel assessment (CCA).

In some embodiments, the FBE parameter includes at least one of:
  a first FBE parameter, where the first FBE parameter includes an uplink frequency domain parameter indicating an uplink frequency domain resource for performing CCA; or
  a second FBE parameter, where the second FBE parameter includes a downlink frequency domain parameter indicating a downlink frequency domain resource for performing CCA.

In some embodiments, the uplink frequency domain resource indicated by the uplink frequency domain parameter is different from the downlink frequency domain resource indicated by the downlink frequency domain parameter. In some embodiments, the method further includes:
  sending the FBE parameter to a user equipment (UE).
In some embodiments, the sending the FBE parameter to the UE includes one of:
  sending radio resource control (RRC) signaling carrying the FBE parameter to the UE; and
  broadcasting broadcast information carrying the FBE parameter to the UE.
In some embodiments, the sending the RRC signaling carrying the FBE parameter to the UE includes:
  sending the RRC signaling carrying the FBE parameter associated with the UE to the UE.
In some embodiments, the frequency domain resource includes at least one of:
  at least one listen-before-talk (LBT) band resource; or
  at least one resource block (RB).
In some embodiments, when sending the FBE parameter to more than one UE, the frequency domain parameter included in the FBE parameter indicates different frequency domain resources for different UEs.

According to a second aspect of the embodiments of the present disclosure, there is provided a method for resource configuration, applied to a user equipment (UE), the method including:
  receiving a frame based equipment (FBE) parameter, where the FBE parameter includes: a frequency domain parameter indicating a frequency domain resource for performing clear channel assessment (CCA).

In some embodiments, the receiving the FBE parameter includes at least one of:
receiving a first FBE parameter, where the first FBE parameter includes: an uplink frequency domain parameter indicating an uplink frequency domain resource for performing CCA; or
receiving a second FBE parameter, where the second FBE parameter includes a downlink frequency domain parameter indicating a downlink frequency domain resource for performing CCA.

In some embodiments, the uplink frequency domain resource indicated by the uplink frequency domain parameter is different from the downlink frequency domain resource indicated by the downlink frequency domain parameter.

In some embodiments, the method further includes:
determining a frequency domain resource for performing CCA according to the frequency domain parameter.

In some embodiments, the receiving the FBE parameter includes one of:
receiving RRC signaling carrying the FBE parameter; and
receiving broadcast information carrying the FBE parameter.

In some embodiments, the receiving the RRC signaling carrying the FBE parameter includes:
receiving the RRC signaling carrying the FBE parameter associated with the UE.

In some embodiments, the frequency domain resource includes at least one of: at least one Listen Before Talk (LBT) band resource; or
at least one resource block (RB).

According to a third aspect of the embodiments of the present disclosure, there is provided an apparatus for resource configuration, applied to a base station, the apparatus including: a configuration module, where,
the configuration module is configured to configure a frame based equipment (FBE) parameter, and the FBE parameter includes: a frequency domain parameter indicating a frequency domain resource for performing clear channel assessment (CCA).

In some embodiments, the FBE parameter includes at least one of:
a first FBE parameter, where the first FBE parameter includes: an uplink frequency domain parameter indicating an uplink frequency domain resource for performing CCA; or
a second FBE parameter, where the second FBE parameter includes: a downlink frequency domain parameter indicating a downlink frequency domain resource for performing CCA.

In some embodiments, the uplink frequency domain resource indicated by the uplink frequency domain parameter is different from the downlink frequency domain resource indicated by the downlink frequency domain parameter.

In some embodiments, the apparatus further includes:
a sending module, configured to send the FBE parameter to a UE.

In some embodiments, the sending module includes one of:
a first sending submodule, configured to send RRC signaling carrying the FBE parameter to the UE; and
a second sending submodule, configured to broadcast information carrying the FBE parameter to the UE.

In some embodiments, the first sending submodule includes:

a sending unit, configured to send the RRC signaling carrying the FBE parameter associated with the UE to the UE.

In some embodiments, the frequency domain resource at least includes one of:
at least one Listen Before Talk (LBT) band resource; and
at least one resource block (RB).

In some embodiments, when sending the FBE parameter to more than one UE, the frequency domain parameter included in the FBE parameter indicates different frequency domain resources for different UEs.

According to a fourth aspect of the embodiments of the present disclosure, there is provided an apparatus for resource configuration, applied to a user equipment (UE), the apparatus including:
a receiving module, where the receiving module is configured to receive a frame based equipment (FBE) parameter, and the FBE parameter includes: a frequency domain parameter indicating a frequency domain resource performing clear channel assessment (CCA).

In some embodiments, the receiving module includes at least one of:
a first receiving submodule, configured to receive a first FBE parameter, where the first FBE parameter includes an uplink frequency domain parameter indicating an uplink frequency domain resource for performing CCA; or
a second receiving submodule, configured to receive a second FBE parameter, where the second FBE parameter includes a downlink frequency domain parameter indicating a downlink frequency domain resource for performing CCA.

In some embodiments, the uplink frequency domain resource indicated by the uplink frequency domain parameter is different from the downlink frequency domain resource indicated by the downlink frequency domain parameter.

In some embodiments, the apparatus further includes:
a determination module, configured to determine a frequency domain resource for performing CCA according to the frequency domain parameter.

In some embodiments, the receiving module includes one of:
a third receiving module, configured to receive RRC signaling carrying the FBE parameter; and
a fourth receiving module, configured to receive broadcast information carrying the FBE parameter.

In some embodiments, the third receiving module includes:
a receiving unit, configured to receive the RRC signaling carrying the FBE parameter associated with the UE.

In some embodiments, the frequency domain resource at least includes one of:
at least one Listen Before Talk (LBT) band resource; and
at least one resource block (RB).

According to a fifth aspect of the embodiments of the present disclosure, there is provided a communication device, including a processor, a memory, and an executable program stored on the memory and executable by the processor, where the processor executes the steps of the method for resource configuration according to the first aspect or the second aspect when running the executable program.

According to a sixth aspect of the embodiments of the present disclosure, there is provided a storage medium, storing with an executable program, where when the executable program is executed by a processor, the steps of the method for resource configuration according to the first aspect or the second aspect are implemented. According to the method for resource configuration, the apparatus, the communication device, and the storage medium provided in the embodiments of the present disclosure, it is included that: a base station configures a frame based equipment FBE parameter, where the FBE parameter includes: a frequency domain parameter indicating a frequency domain resource for performing clear channel assessment (CCA). In this way, the FBE parameter containing the frequency domain parameter is configured, and the frequency domain resource for the CCA may be configured, for example, the frequency domain parameters configured for the base station and the UE may allocate different frequency domain resources to different transmissions, thus reducing the conflict of the frequency domain resources for performing CCA, and further improving the efficiency of data transmission.

Other embodiments of the embodiments of the present disclosure will be apparent to those skilled in the art from consideration of the specification and practice of the disclosure disclosed here. The present disclosure is intended to cover any variations, uses, or adaptations of the embodiments of the present disclosure following the general principles of the embodiments of the present disclosure and including common general knowledge or customary technical means in the art not disclosed in the embodiments of the present disclosure. It is intended that the specification and embodiments are considered as examples, with the true scope and spirit of the embodiments of the present disclosure being indicated by the following claims.

It should be understood that the embodiments of the present disclosure are not limited to the precise structures that have been described above and illustrated in the accompanying drawings, and various modifications and changes may be made without departing from the scope thereof. The scope of the embodiments of the present disclosure is limited only by the appended claims.

What is claimed is:

1. A method for resource configuration, applied to a base station, the method comprising:
configuring a frame based equipment (FBE) parameter, wherein the FBE parameter comprises a first FBE parameter and a second FBE parameter, the first FBE parameter comprises an uplink frequency domain parameter indicating an uplink frequency domain resource for UE performing CCA, the second FBE parameter comprises a downlink frequency domain parameter indicating a downlink frequency domain resource for the base station performing CCA, wherein the uplink frequency domain resource and the downlink frequency domain resource respectively include different frequency bands with different communication frequencies.

2. The method according to claim 1, wherein the method further comprises:
sending the FBE parameter to a user equipment (UE).

3. The method according to claim 2, wherein the sending the FBE parameter to the UE comprises one of:
sending radio resource control (RRC) signaling that carries the FBE parameter to the UE; and
broadcasting broadcast information carrying the FBE parameter to the UE.

4. The method according to claim 3, wherein the sending the RRC signaling carrying the FBE parameter to the UE comprises:
sending the RRC signaling carrying the FBE parameter associated with the UE to the UE.

5. The method according to claim 1, wherein the frequency domain resource comprises at least one of following resources:
at least one Listen Before Talk (LBT) band resource; or
at least one resource block (RB).

6. The method according to claim 1, wherein in response to sending the FBE parameter to more than one UE, the frequency domain parameter comprised in the FBE parameter indicates different frequency domain resources for different UEs.

7. A method for resource configuration, applied to a user equipment (UE), the method comprising:
receiving a frame based equipment (FBE) parameter, wherein the FBE parameter comprises a first FBE parameter and a second FBE parameter, the first FBE parameter comprises an uplink frequency domain parameter indicating an uplink frequency domain resource for UE performing CCA, the second FBE parameter comprises a downlink frequency domain parameter indicating a downlink frequency domain resource for the base station performing CCA, wherein the uplink frequency domain resource and the downlink frequency domain resource respectively include different frequency bands with different communication frequencies.

8. The method according to claim 7, wherein the method further comprises:
determining a frequency domain resource for performing CCA according to the frequency domain parameter.

9. The method according to claim 7, wherein the receiving the FBE parameter comprises one of:
receiving RRC signaling carrying the FBE parameter; and
receiving broadcast information carrying the FBE parameter.

10. The method according to claim 9, wherein the receiving the RRC signaling carrying the FBE parameter comprises:
receiving the RRC signaling carrying the FBE parameter associated with the UE.

11. The method according to claim 7, wherein the frequency domain resource comprises at least one of following resources:
at least one Listen Before Talk (LBT) band resource; or
at least one resource block (RB).

12. A communication device, comprising at least one processor, a memory, and an executable program stored on the memory and executable by the at least one processor, wherein the at least one processor executes the steps of the method for resource configuration according to claim 7 when running the executable program.

13. A communication device, comprising at least one processor, a memory, and an executable program stored on the memory and executable by the at least one processor, wherein the at least one processor executes a method for resource configuration applied to a base station when running the executable program, and the method comprises:
configuring a frame based equipment (FBE) parameter, wherein the FBE parameter comprises a first FBE parameter and a second FBE parameter, the first FBE parameter comprises an uplink frequency domain parameter indicating an uplink frequency domain resource for UE performing CCA, the second FBE parameter comprises a downlink frequency domain parameter indicating a downlink frequency domain resource for the base station performing CCA, wherein the uplink frequency domain resource and the downlink frequency domain resource respectively include different frequency bands with different communication frequencies.

14. The communication device according to claim 13, wherein the method further comprises:
sending the FBE parameter to a UE.

15. The communication device according to claim 13, wherein the frequency domain resource comprises at least one of:
at least one Listen Before Talk (LBT) band resource; or
at least one resource block (RB).

* * * * *